United States Patent Office 3,366,663
Patented Jan. 30, 1968

3,366,663
PROCESS FOR PREPARING TETRAALKYL-
AMMONIUM ALKYL SULFATES
Le Moyne W. Plischke, Pensacola, Fla., assignor to
Monsanto Company, St. Louis, Mo., a corporation
of Delaware
No Drawing. Filed Nov. 9, 1964, Ser. No. 409,928
8 Claims. (Cl. 260—459)

ABSTRACT OF THE DISCLOSURE

This invention relates to a process for preparing a tetraalkylammonium alkyl sulfate by reaction of a mixture consisting essentially of a trialkylamine and a dialkyl sulfate.

---

The preparation of tetraalkylammonium alkyl sulfate salts by the reaction of dialkylsulfate esters with tertiary alkyl amines is well-known. Most well-known methods for producing tetraalkylammonium alkyl sulfate salts involve the use of water, alcohol or benzene as solvents. Generally, a selected trialkylamine is dissolved in water or other solvent. A selected dialkyl sulfate ester is then fed into the trialkylamine solution. As long as the tetraalkylammonium alkyl sulfate salt has a relatively low molecular weight, for example, methyltriethylammonium methyl sulfate, the product yield is usually quite high, 98–99 percent of theoretical. But, when a relatively high molecular weight tetraalkylammonium alkyl sulfate salt, such as methyltributylammonium methyl sulfate, is produced in water the product yield may be as low as 25.5 percent of theoretical.

Because of the recent advent of a process for electrolytically producing adiponitrile from acrylonitrile wherein tetraalkylammonium alkyl sulfate salts are used as a supporting electrolyte, a method for producing such tetraalkylammonium alkyl sulfate salts in high yields and in a highly pure state has increased in importance. When solvents are employed in the tetraalkylammonium alkyl sulfate salt producing reaction, a product purity problem is inherent, i.e., the solvent itself must be removed. In the above noted electrolytic process impurity levels above two to three percent are technically unacceptable.

Therefore, it is an object of this invention to provide a method for producing high yields of relatively pure tetraalkylammonium alkyl sulfate salts.

A further object is to provide a method for producing relatively pure tetraalkylammonium alkyl sulfate salts in high yield from dialkyl sulfate esters and trialkylamines.

Other objects will become apparent from the following descriptive material.

Briefly stated, the invention embraces a process for producing a tetraalkylammonium alkyl sulfate from a dialkyl sulfate ester and a trialkylamine comprising contacting these reactants in a reaction zone wherein the presence in said zone of materials other than the above-named reactants and product is substantially excluded.

The invention can be used to prepare tetraalkylammonium alkyl sulfate salts wherein the alkyl group or groups have from one (1) to eight (8) carbon atoms therein.

The advantages of the invention become more significant as the molecular weight of the product increases. When the product's molecular weight is relatively low, the process of the invention does not yield significantly higher product yields. Nevertheless, it does have the advantage of producing a product substantially uncontaminated by solvent or by-products resulting from hydrolysis or other side reactions. When the molecular weight of the product is about 240 or above, the increase in product yield becomes quite significant. This point is well illustrated by the table next below.

TABLE I.—TETRAALKYLAMMONIUM ALKYL SULFATE PREPARATION

| Tetraalkylammonium Alkyl Sulfate | Mol. Wt. | Yield (percent) | |
|---|---|---|---|
| | | Aqueous Solution | No Solvent |
| Methyltriethylammonium Methyl Sulfate | 227.32 | 98.3 | 98.3 |
| Methyltriethylammonium Ethyl Sulfate | 241.35 | 95.5 | 97.5 |
| Tetraethylammonium Ethyl Sulfate | 255.37 | 68.6 | 97.1 |
| Methyltributylammonium Methyl Sulfate | 311.47 | 25.5 | 95.5 |

To practice the invention, a selected dialkyl sulfate ester is added to a quantity of selected trialkylamine. Advantageously, the addition takes place at a temperature higher than the melting point of the tetraalkylammonium alkyl sulfate salt to be produced. At or below the melting point, crystallization takes place as the salt is formed. Material handling, therefore, is facilitated when the reaction temperature is maintained above the melt point of the salt.

The results obtained by the inventive non-solvent procedure and the results obtained by carrying out the reaction in aqueous solution are comparatively summarized in Table II.

TABLE II.—PREPARATION OF TETRAALKYLAMMONIUM ALKYL SULFATES

| Tetraalkylammonium Alkyl Sulfate | Reactants | | | | Solvent | Reaction Conditions | | | | Yield (percent) |
|---|---|---|---|---|---|---|---|---|---|---|
| | Dialkyl Sulfate | | Tertiary Alkyl Amine | | | Initial Reaction | | Additional Reaction Period | | |
| | $(R)_2SO_4$ | Mole | $(R)_3N$ | Mole | | Temp. (°C.) | Time for Addition (min.) | Temp. (°C.) | Time (min.) | |
| $CH_3(C_2H_5)_3NSO_4CH_3$ | $(CH_3)_2SO_4$ | 1.00 | $(C_2H_5)_3N$ | 1.10 | None | 45 | 20 | 50 | 30 | 98.3 |
| $CH_3(C_2H_5)_3NSO_4CH_3$ | $(CH_3)_2SO_4$ | 2.50 | $(C_2H_5)_3N$ | 2.75 | $H_2O$ | 50 | 15 | 40 | 30 | 98.3 |
| $CH_3(C_2H_5)_3NSO_4C_2H_5$ | $(C_2H_5)_2SO_4$ | 1.00 | $CH_3(C_2H_5)_2N$ | 1.20 | None | 65 | 32 | 67 | 90 | 97.5 |
| $CH_3(C_2H_5)_3NSO_4C_2H_5$ | $(C_2H_5)_2SO_4$ | 1.00 | $CH_3(C_2H_5)_2N$ | 1.20 | $H_2O$ | 58 | 35 | 60 | 90 | 95.5 |
| $(C_2H_5)_4NSO_4C_2H_5$ | $(C_2H_5)_2SO_4$ | 155.3 | $(C_2H_5)_3N$ | 186.5 | None | 75 | 160 | 80 | 270 | 97.9 |
| $(C_2H_5)_4NSO_4C_2H_5$ | $(C_2H_5)_2SO_4$ | 1.00 | $(C_2H_5)_3N$ | 1.20 | ---do--- | 75 | 30 | 80 | 30 | 97.1 |
| $(C_2H_5)_4NSO_4C_2H_5$ | $(C_2H_5)_2SO_4$ | 1.00 | $(C_2H_5)_3N$ | 1.20 | $H_2O$ | 75 | 40 | 76 | 30 | 68.6 |
| $CH_3(C_4H_9)_3NSO_4CH_3$ | $(CH_3)_2SO_4$ | 1.00 | $(C_4H_9)_3N$ | 1.20 | $H_2O$ | 5 | 30 | 5 | 1,200 | 92.0 |
| $CH_3(C_4H_9)_3NSO_4CH_3$ | $(CH_3)_2SO_4$ | 1.00 | $(C_4H_9)_3N$ | 1.20 | None | 110 | 35 | 110 | 360 | 95.5 |
| $CH_3(C_4H_9)_3NSO_4CH_3$ | $(CH_3)_2SO_4$ | 1.00 | $(C_4H_9)_3N$ | 1.20 | $H_2O$ | 100 | 35 | 98 | 360 | 25.5 |

Reaction rates depend upon the reactants, temperature, etc. Low molecular weight esters and amines react faster than do esters and amines having higher molecular weights. The application of heat increases the rate of reaction.

Generally, the proportion of reactants is determined by the stoichiometry of the reaction. A stoichiometric excess of amine is generally preferred. An excess of about 10 percent has been found to be quite adequate.

After substantially complete reaction, excess, unreacted, amine is recovered by conventional means. Recovered trialkylamine is reuseable as feed stock for the reaction.

As noted hereinabove, a particular reaction temperature partially depends upon the selected reactants, but is usually greater than the melt point of the tetraalkylammonium alkyl sulfate salt to be produced. Reaction temperature upper limits are governed by a number of factors. Among these is the temperature at which decomposition of salt or reactants occurs. For the production of most tetraalkylammonium alkyl sulfate salts a reaction temperature between 25° C. and 100° C. is generally suitable.

Reaction pressure, in general, can be maintained at about atmospheric pressure. Very little or no advantage is achieved when the employed pressure is above or below atmospheric.

Contact time in the reaction is dependent upon temperature, reaction kinetics, particular reactants, and the rate at which heat of reaction can be removed if such is necessary. To illustrate, in preparing tetraethylammonium ethyl sulfate an adequate cooling system is required; yet, in preparing methyltributylammonium methyl sulfate it may be desirable to supply heat to the reaction. In the preparation of tetraethylammonium ethyl sulfate, the reaction goes to substantial completion within one hour. Higher molecular weight salts, such as methyltributylammonium methyl sulfate, require longer reaction periods assuming, of course, that all other reaction conditions are the same. As a general rule, however, for the production of most commercially useful tetraalkylammonium alkyl sulfates, reaction contact time ranges from 0.5 to 1.5 hours.

In well-known manufacturing processes employing solvents, especially water, for producing a tetraalkylammonium alkyl sulfate salt from a dialkyl sulfate ester and a trialkyl amine a main cause of low product yield is dialkyl sulfate ester hydrolysis. To increase reaction rates, temperatures are increased in many chemical reactions. But increased temperatures result in increased hydrolysis in the production of tetraalkylammonium alkyl sulfate salts in aqueous solution. Therefore, when the reaction between amine and ester takes place in the absence of water or other solvents, greater reaction temperature are possible, thus greater reaction rates.

When, as noted before, a dialkyl sulfate ester is reacted with a trialkylamine in the absence of any solvent, especially water, the product is a tetraalkylammonium alkyl sulfate salt in a highly pure state. But, when water, the generally used solvent, is employed hydrolysis becomes quite significant. In producing tetraalkylammonium alkyl sulfate salts from the above named reactants, a competing reaction takes place. The dialkyl sulfate ester reacts with water to produce a monoalkyl sulfate and an alkyl alcohol. The monoalkyl sulfate, which is acidic, reacts with trialkylamine to produce a trialkylammonium alkyl sulfate salt. As is readily apparent, this side reaction decreases the yield of desired product. Even more important, however, both tetraalklylammonium alkyl sulfate salts and trialkylammonium alkyl sulfate salts crystallize under about the same conditions. Therefore, it is quite difficult to separate trialkylammonium alkyl sulfate salts from the desired tetraalkylammonium alkyl sulfate salt. This problem, because only very small quantities of hydrolysis by-products are produced, is substantially overcome by the method of the invention.

In the preparation of one of the most important salts, tetraethylammonium ethyl sulfate, by the process of this invention, the reactants, diethyl sulfate and triethylamine, are miscible in all proportions at ambient temperature. In the preparation of this salt in aqueous solution, triethylamine is significantly soluble in water only at rather low temperatures. At 18.7° C. triethylamine is 50 percent soluble in water. At 20° C. the solubility drops off to 10.28 percent. Therefore, it is apparent that when water is used as a solvent for the reaction it is necessary that the solution be cooled to well below ambient temperature. This is not necessary by the method of the invention.

The examples appearing hereinafter are intended to illustrate the invention and its advantages over the prior art. It is not intended that the invention be limited thereby in any manner whasoever.

EXAMPLE I

*Tetraethylammonium ethyl sulfate (anhydrous)*

Tetraethylammonium ethyl sulfate was prepared by adding 154.2 grams (1.0 mole) of diethyl sulfate to 121.4 grams (1.20 moles) of triethylamine. Reaction temperature was maintained at 75° C. during the diethyl sulfate addition, which took place in a 30-minute period. The solution was heated at 80° C. for 30 additional minutes while being continuously stirred. Water was then added to the reaction mixture and the excess triethylamine recovered by distillation as an azeotrope with water. A product yield of 97.1 percent of theoretical was obtained.

EXAMPLE II

*Tetraethylammonium ethyl sulfate (aqueous)*

Tetraethylammonium ethyl sulfate was produced by adding 154.2 grams (1.00 mole) of diethyl sulfate to an aqueous solution composed of 121.4 grams (1.20 moles) of triethylamine and 255.4 grams of water. Reaction temperature was maintained at 75° C. during the diethyl sulfate addition, which took 40 minutes. For an additional 30 minutes the reaction mixture was held at 76° C. (reflux temperature) while being agitated. The excess triethylamine was then recovered by distillation as an azeotrope with water.

A product yield of 68.6 percent of theoretical was obtained by this process. It can easily be seen that this yield is a great deal below the yield of the anhydrous procedure outlined in Example I.

EXAMPLE III

*Methyltributylammonium methyl sulfate (anhydrous)*

Methyltributylammonium methyl sulfate was prepared by adding 126.1 grams (1.00 mole) of dimethyl sulfate to 222.4 grams (1.20 moles) of tri-n-butylamine. Reaction temperature was maintained at 110° C. during the addition of the dimethyl sulfate. Dimethyl sulfate addition took 35 minutes. The reaction mixture was stirred for an additional 6 hours while maintaining the temperature at 110° C. Water was then added to the reaction mixture. Excess tri-n-butylamine was recovered by distillation on a flash evaporator under reduced pressure. A product yield of 95.5 percent of theoretical was obtained.

EXAMPLE IV

*Methyltributylammonium methyl sulfate (aqueous)*

Methyltributylammonium methyl sulfate was prepared by adding 126.1 grams (1.00 mole) of dimethyl sulfate to an aqueous solution composed of 222.4 (1.20 moles) of tri-n-butylamine and 311.5 grams of water. During the addition of dimethyl sulfate, which took 35 minutes, the reaction mixture was maintained at 100° C. The solution was stirred for an additional 6 hours during which time the temperature was maintained at 98° C. (reflux temperature). Unreacted tri-n-butylamine was recovered by distillation on a flash evaporator under reduced pressure. Product yield was 25.5 percent of theoretical.

EXAMPLE V

*Methyltriethylammonium ethyl sulfate (anhydrous)*

Methyltriethylammonium ethyl sulfate was prepared by adding 154.2 grams (1.0 mole) of diethyl sulfate to 104.6 grams (1.2 moles) of methyl diethylamine. This addition took 32 minutes. Reaction temperature was maintained at 65° C. After the addition of diethyl sulfate was completed the reaction temperature was maintained at 67° C. for 90 minutes while the solution was continuously agitated. Water was then added to the reaction mixture and the excess triethylamine recovered by distillation. The product yield was 97.5 of theoretical.

EXAMPLE VI

*Methyltriethylammonium ethyl sulfate (aqueous)*

To prepare methyltriethylammonium ethyl sulfate in aqueous solution, 154.2 grams (1.0 mole) of diethyl sulfate were added to an aqueous solution made up of 104.6 grams (1.2 moles) of methyldiethylamine and 241.4 grams of water. Diethyl sulfate addition took 35 minutes at a reaction temperature of 58° C. The solution was stirred for an additional hour and a half during which time the temperature was maintained at 60° C. Excess amine was recovered by distillation. Product yield was 95.5 percent of theoretical.

This inventive process for preparing tetraalkylammonium alkyl sulfate salts possesses a number of advantages. By this procedure tetraalkylammonium alkyl sulfate salts are obtained in nearly quantitative yields while side reactions, such as hydrolysis of the dialkyl sulfate ester to a trialkylammonium alkyl sulfate salt, are reduced to a minimum. Since, by this invention, a much higher reaction temperature may be employed without hydrolyzing the dialkyl sulfate ester, as happens when water is used as a solvent, a much faster rate of reaction is obtainable than would be possible in aqueous solution. Furthermore, higher reaction temperatures may be employed than could be maintained with either water or alcohol as the solvent. In the method for preparing salts, such as tetraethylammonium ethyl sulfate, as disclosed by this invention, the two reactants, dialkyl sulfate ester and trialkylamine, are miscible in all proportions. In the preparation of the desired salt in aqueous solution, the triethylamine is reasonably soluble in water at low temperatures, decreasing sharply above 18.7° C. Since by this process it is unnecessary to maintain the reaction temperature at ambient or below, no elaborate or expensive cooling system is required.

The invention has been described with reference to particular embodiments. It must be clearly understood, however, that the invention is to be limited only by the scope of the appended claims.

What is claimed is:

1. A process for preparing a tetraalkylammonium alkyl sulfate consisting of maintaining a mixture consisting essentially of a trialkylamine in which each alkyl group contains from one to four carbon atoms and a dialkyl sulfate in which each alkyl group contains one to two carbon atoms at a temperature higher than the melting point of the resulting tetraalkylammonium alkyl sulfate.

2. A process as defined in claim 1, in which the trialkylamine is triethylamine, tributylamine, or methyldiethylamine.

3. A process as defined in claim 1, in which the dialkyl sulfate is diethyl or dimethyl sulfate.

4. A process as defined in claim 1, in which the molecular weight of the tetraalkylammonium alkyl sulfate is at least about 240.

5. A process as defined in claim 1, in which the temperature of the mixture is between 25° and 100° C.

6. A process as defined in claim 1, in which the mixture is maintained at said temperature until the reaction is substantially complete.

7. A process as defined in claim 1, in which the mixture is maintained at said temperature for between 0.5 and 1.5 hours.

8. A process as defined in claim 1, in which the mixture contains a stoichiometric excess of the trialkylamine.

References Cited

UNITED STATES PATENTS

| | | | |
|---|---|---|---|
| 2,295,505 | 9/1942 | Shelton | 260—567.6 X |
| 2,435,583 | 2/1948 | Gump | 260—567.6 |
| 2,569,326 | 9/1951 | Niederl et al. | 260—567.6 X |
| 2,759,019 | 8/1956 | Brown et al. | 260—459 X |
| 2,817,675 | 12/1957 | Hofer et al. | 260—459 |
| 2,871,091 | 1/1959 | Passedouet | 260—459 X |
| 3,000,946 | 9/1961 | Stevens | 260—459 X |

FLOYD D. HIGEL, *Primary Examiner.*